United States Patent
Taylor et al.

(10) Patent No.: US 10,754,035 B2
(45) Date of Patent: Aug. 25, 2020

(54) GROUND CLASSIFIER SYSTEM FOR AUTOMATED VEHICLES

(71) Applicant: Aptiv Technologies Limited, St. Michael (BB)

(72) Inventors: Ronald M. Taylor, Greentown, IN (US); Izzat H. Izzat, Oak Park, CA (US)

(73) Assignee: Aptiv Technologies Limited (BB)

( * ) Notice: Subject to any disclaimer, the term of this patent is extended or adjusted under 35 U.S.C. 154(b) by 786 days.

(21) Appl. No.: 15/407,404

(22) Filed: Jan. 17, 2017

(65) Prior Publication Data

US 2018/0203113 A1    Jul. 19, 2018

(51) Int. Cl.
| | |
|---|---|
| G01C 3/08 | (2006.01) |
| G01S 17/86 | (2020.01) |
| G01S 7/48 | (2006.01) |
| G06T 7/11 | (2017.01) |
| G06K 9/00 | (2006.01) |
| G06K 9/62 | (2006.01) |
| G06K 9/32 | (2006.01) |
| G06K 9/46 | (2006.01) |

(52) U.S. Cl.
CPC ............ *G01S 17/86* (2020.01); *G01S 7/4802* (2013.01); *G06K 9/00791* (2013.01); *G06K 9/3233* (2013.01); *G06K 9/4642* (2013.01); *G06K 9/6267* (2013.01); *G06T 7/11* (2017.01)

(58) Field of Classification Search
USPC .............................................. 356/3.01–5.15
See application file for complete search history.

(56) References Cited

U.S. PATENT DOCUMENTS

| | | | |
|---|---|---|---|
| 2011/0170768 A1* | 7/2011 | Alldrin | G06K 9/4661 382/159 |
| 2012/0069185 A1* | 3/2012 | Stein | G06K 9/00798 348/148 |

(Continued)

OTHER PUBLICATIONS

Liable Stefan Et Al: "Terrain classification with conditional random fields on fused 3D LIDAR and camera data", Sep. 25, 2013, pp. 172-177.

(Continued)

*Primary Examiner* — Samantha K Abraham
(74) *Attorney, Agent, or Firm* — Joseph V. Bonadies

(57) ABSTRACT

A ground-classifier system that classifies ground-cover proximate to an automated vehicle includes a lidar, a camera, and a controller. The lidar that detects a point-cloud of a field-of-view. The camera that renders an image of the field-of-view. The controller is configured to define a lidar-grid that segregates the point-cloud into an array of patches, and define a camera-grid that segregates the image into an array of cells. The point-cloud and the image are aligned such that a patch is aligned with a cell. A patch is determined to be ground when the height is less than a height-threshold. The controller is configured to determine a lidar-characteristic of cloud-points within the patch, determine a camera-characteristic of pixels within the cell, and determine a classification of the patch when the patch is determined to be ground, wherein the classification of the patch is determined based on the lidar-characteristic and the camera-characteristic.

20 Claims, 2 Drawing Sheets

(56) References Cited

U.S. PATENT DOCUMENTS

| | | | | |
|---|---|---|---|---|
| 2015/0293228 A1* | 10/2015 | Retterath | ............... | G01S 17/89 |
| | | | | 356/5.01 |
| 2015/0379766 A1* | 12/2015 | Newman | ............... | G01S 17/87 |
| | | | | 356/5.01 |
| 2016/0003946 A1* | 1/2016 | Gilliland | ............... | G01S 17/10 |
| | | | | 356/5.01 |
| 2016/0016560 A1* | 1/2016 | Parker | ............... | B60W 30/09 |
| | | | | 701/70 |
| 2016/0116593 A1* | 4/2016 | Kim | ............... | G01S 17/06 |
| | | | | 701/70 |
| 2016/0132745 A1* | 5/2016 | Falb | ............... | G06K 9/4604 |
| | | | | 348/148 |
| 2018/0144496 A1* | 5/2018 | Posner | ............... | G06K 9/00214 |

OTHER PUBLICATIONS

Stefan Laible Et Al: "3D LIDAR- and Camera-Based Terrain Classification Under Different Lighting Conditions", Jan. 1, 2012, pp. 21-29.

Marcel Haselich et al: "Terrain Classification with Markov Random Fields on fused Camera and 3D Laser Range Data", Aug. 1, 2012, pp. 1-6.

\* cited by examiner

GROUND CLASSIFIER SYSTEM FOR AUTOMATED VEHICLES

TECHNICAL FIELD OF INVENTION

This disclosure generally relates to a ground-classifier system that classifies ground-cover proximate to an automated vehicle, and more particularly relates to a system that determines a classification of a patch of ground based on a lidar-characteristic of the patch indicated by a lidar and the camera-characteristic of the patch indicated by a camera.

BACKGROUND OF INVENTION

It is advantageous for an automated vehicle to be able to distinguish the composition or type of surface upon which the automated vehicle is traveling. For example, if the travel-path of the automated vehicle is upon snow or gravel, the dynamic behavior of the automated vehicle is different from the dynamic behavior when traveling on pavement, e.g. concrete or asphalt. Being able to distinguish pavement from gravel or grass is also useful to determine the relative location of the edge of a paved roadway. What is needed is a system that is able to distinguish or identify various types of ground surface classifications such as concrete, asphalt, gravel, dirt, grass, snow, and the like.

SUMMARY OF THE INVENTION

Camera images have been widely used by automated vehicles for classification of objects using computer vision and image processing techniques. Recently, lidar has become more common given to its high quality detection of obstacles. In addition, to providing three-dimensional (3D) measurements, most lidars provide lidar-characteristics such as intensity values for each cloud-point detected by the lidar, where, for example, the intensity is an indication of a reflectivity-value of objects that reflected laser pulses emitted by the lidar. The intensity values may be based on an average, median, histogram, or other processed measures derived from lidar intensity as is known in the art. Described herein is a system for classification of ground surfaces such as grass and asphalt using lidar-characteristics indicated by the lidar and camera-characteristics indicated in an image rendered by a camera.

In accordance with one embodiment, a ground-classifier system that classifies ground-cover proximate to an automated vehicle is provided. The system includes a lidar, a camera, and a controller. The lidar that detects a point-cloud of a field-of-view about a host-vehicle. The camera that renders an image of the field-of-view. The controller is in communication with the camera and the lidar. The controller is configured to define a lidar-grid that segregates the point-cloud into an array of patches, and define a camera-grid that segregates the image into an array of cells. The point-cloud and the image are aligned such that a patch is aligned with a cell. The controller is further configured to determine a height of cloud-points within the patch. The patch is determined to be ground when the height is less than a height-threshold. The controller is configured to determine a lidar-characteristic of cloud-points within the patch, determine a camera-characteristic of pixels within the cell, and determine a classification of the patch when the patch is determined to be ground, wherein the classification of the patch is determined based on the lidar-characteristic and the camera-characteristic.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
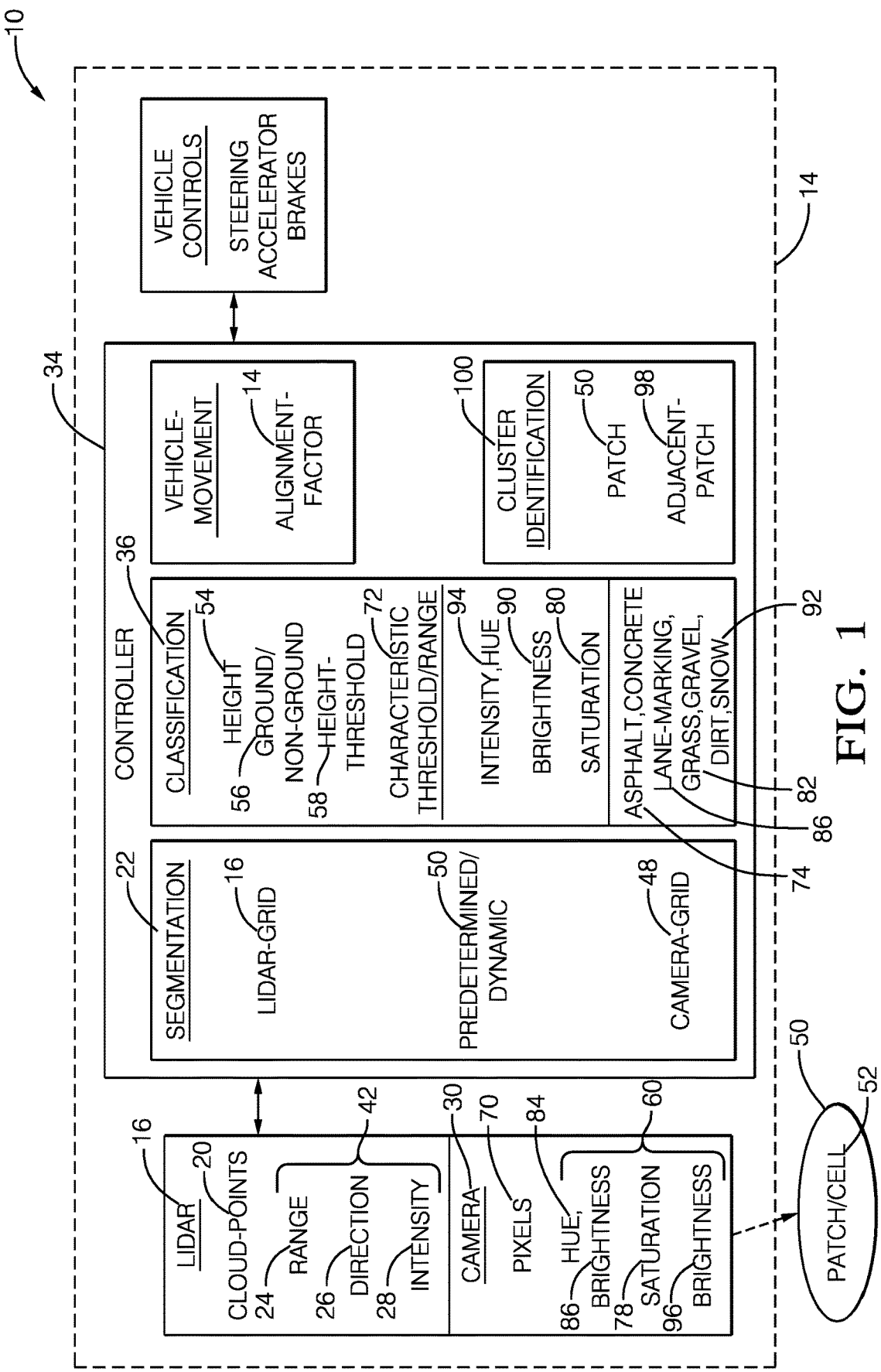
FIG. 1 is a diagram of a ground-classifier system in accordance with one embodiment.

FIG. 1 illustrates a non-limiting example of a ground-classifier system 10, hereafter referred to as the system 10. As part of operating an automated vehicle, for example a host-vehicle 14, the system 10 classifies a ground-cover 12 (FIG. 2) proximate to (i.e. surrounding, nearby, or in view of sensors used by the system 10) the host-vehicle 14. As used herein, the term ground-cover refers to whatever material or substance is exposed on the surface of the ground proximate to the host-vehicle. By way of example, the ground-cover 12 may be, but is not limited to, asphalt, concrete, a lane-marking, grass, gravel, dirt, snow, and the like. The host-vehicle 14 may be able to travel on many of these and other examples of ground-cover. However, it is recognized that some surfaces maybe preferable to others. For example, it is typically preferable to drive on concrete rather than snow or ice.

As used herein, the term automated vehicle may apply to instances when the host-vehicle 14 is being operated in an automated-mode, i.e. a fully autonomous mode, where a human-operator (not shown) of the host-vehicle 14 may do little more than designate a destination in order to operate the host-vehicle 14. However, full automation is not a requirement. It is contemplated that the teachings presented herein are useful when the host-vehicle 14 is operated in a manual-mode where the degree or level of automation may be little more than the system 10 providing an audible or visual warning to the human-operator who is generally in control of the steering, accelerator, and brakes of the host-vehicle 14. For example, the system 10 may merely assist the human-operator as needed to avoid traveling on less than desirable instances of the ground-cover; ice or snow for example.

Figure 2:
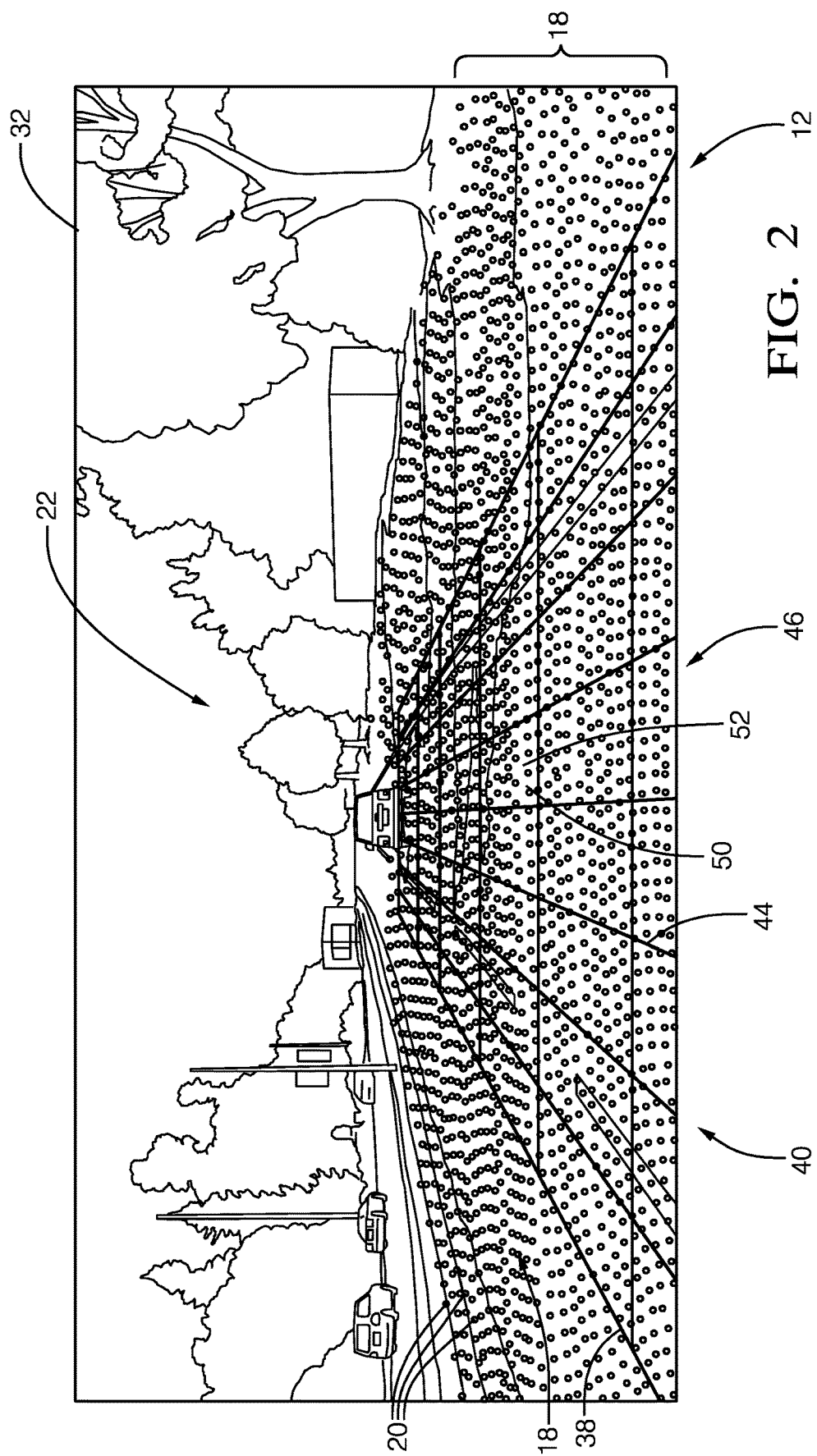
FIG. 2 is an illustration of a field-of-view of sensors used by the system of FIG. 1 in accordance with one embodiment.

Continuing to refer to FIGS. 1 and 2, the system 10 includes a lidar 16 that detects a point-cloud 18 of cloud-points 20 detected in a field-of-view 22 of the lidar 16 about or proximate to the host-vehicle 14. As used herein, the point-cloud 18 refers to the entire collection of the cloud-points 20 detected by the lidar 16, and the cloud-points 20 may be used to refer to some particular subset of the point-cloud 18. As will be recognized by those in the art, each instance of a cloud-point that is detected by the lidar 16 is typically characterized by a range 24 and a direction 26 relative to the lidar 16, which is typically mounted on the host-vehicle 14, and an intensity 28 of the lidar laser-beam reflected by whatever is located at the cloud-point. The non-limiting example of FIG. 2 illustrates the point-cloud 18 as covering only a portion of the field-of-view 22, but this is done only to simplify the illustration. It is contemplated that the point-cloud 18 could cover a greater distance that suggested in FIG. 2, and the point-cloud 18 could cover a 360° field-of-view around the host-vehicle 14.

The system 10 also includes a camera 30 that renders an image 32 (FIG. 2) of the field-of-view 22. As above, the non-limiting example of the image 32 does not cover a 360° field-of-view around the host-vehicle 14 only to simplify the illustration. While FIG. 2 is illustrated as a black and white drawing, the camera 30 is preferably a color camera so that color information (e.g. hue, saturation) is available to help classify the ground-cover 12, as will be explained in more detail later. While FIG. 1 illustrates the lidar 16 and the camera 30 as a combined unit, this is not a requirement. Co-locating the lidar 16 and the camera 30 may be preferable as it makes simpler the aligning of the point-cloud 18 to the image 32. Furthermore, even if the lidar 16 and the camera 30 are co-located, it is expected that further electronic alignment of the point-cloud 18 and the image 32 will improve the overall performance of the system 10 described herein. Various methods to align the point-cloud 18 and the image 32 are known.

The system 10 also includes a controller 34 in communication with the camera 30 and the lidar 16. The communication may be by way of wires, optical-cable, wireless-communications, or any combination thereof, as will be known to those in the art. The controller 34 may include a processor (not specifically shown) such as a microprocessor or other control circuitry such as analog and/or digital control circuitry including an application specific integrated circuit (ASIC) for processing data as should be evident to those in the art. The controller 34 may include memory (not specifically shown), including non-volatile memory, such as electrically erasable programmable read-only memory (EEPROM) for storing one or more routines, thresholds, and captured data. The one or more routines may be executed by the processor to perform steps for determining a classification 36 of the ground-cover 12 based on signals received by the controller 34 from the lidar 16 and the camera 30 as described herein.

The controller 34 is configured to or programmed to define a lidar-grid 38 that segregates the point-cloud 18 into an array of patches 40. In one embodiment of the system 10 the lidar-grid 38 may be predetermined based on empirical testing so that size of each of the patches 40 is fixed, which corresponds to what is illustrated in FIG. 2. It is noted that that the non-limiting example of the lidar-grid 38 illustrated in FIG. 2 is much coarser so each of the patches 40 is much larger than is contemplated for an actual implementation of the system 10. This was done only to simplify the drawing. By way of example, an example size of each of the patches 40 in an actual implementation of system 10 may be twenty centimeters square (0.02 m×0.02 m).

In another embodiment, the lidar-grid 38 may be dynamically determined based on a lidar-characteristic 42 (e.g. the range 24, the direction 26, and/or the intensity 28) of each of the cloud-points 20 in the point-cloud 18. For example, the controller 34 may form an irregularly shaped patch by selecting instances of the cloud-points 20 that are adjacent to each other and have the same or about the same value of the intensity 28. While more complicated than the fixed or predetermined instance of the lidar-grid 38, this implementation may be able to better determine the relative position of the edge of the roadway where the ground-cover 12 transitions from, for example, asphalt to gravel.

The patches 40 shown in FIG. 2 may represent an arbitrary division of the ground-cover. This may result in instances of the patches 40 that be characterized by more than a single selection of the classification 36. Therefore, the classifier may not be able to differentiate an accurate demarcation of one classification to another. In another embodiment, the ground may first be segmented using the intensity 28 and/or information in the image 32. The segmentation of the ground-cover 12 may then be partitioned and then classified sequentially to better separate the areas of the ground-cover 12 that have the same classification.

The controller 34 is also configured to define a camera-grid 44 that segregates the image 32 into an array of cells 46. As suggested above, in addition to physical alignment of the lidar 16 and the camera 30, the controller 34 may provide for electronic alignment so that the point-cloud 18 and the image 32 are aligned such that a patch 50 of the array of patches 40 is aligned with a cell 52 of the array of cells 46.

As a first step of determining the classification 36 of the patch 50 of the ground-cover 12, the controller 34 is configured to determine a height 54 of the instances of cloud-points within the patch 50. Those in the art will recognize that the height 54 of a cloud-point can be determine based on the range 24 and the direction 26, which may be expressed in terms of azimuth-angle and elevation-angle. The patch 50 may be determined to be ground 56 when the height 54 is less than a height-threshold 58, ten centimeters (0.01 m) for example. The patch 50 may be determined to be non-ground if some or all of the cloud-points 20 within the patch 50 are not less than the height-threshold 58.

As a next step, the system 10, or more specifically the controller 34, determines the lidar-characteristic 42 (e.g. the range 24, the direction 26, and/or the intensity 28) of the cloud-points 20 within the patch 50. The goal or desire is to determine a reflectivity-value of the ground-cover 12 within the patch 50 and elsewhere in the field-of-view 22 as the reflectivity-value is often a strong indication of the classification 36 of the ground-cover 12. The reflectivity-value can be determined based on the intensity 28, but the intensity 28 can vary with the range 24 and/or the direction 26. That is, the classification 36 of the ground-cover 12 is characterized by the reflectivity-value, and the reflectivity-value influences the intensity 28. However, for example, the intensity 28 of an instance of the cloud-points 20 will decrease as the range 24 increases. It is also known that the intensity 28 can vary with the direction 26. That is, the angle at which the ground-cover 12 is viewed has an effect in the intensity 28. The relationship between the intensity 28, the range 24 and the direction 26 is known to those in the lidar arts, so in many instances in this disclosure the intensity 28 and the reflectivity-value are interchangeable terms.

The controller 34 is also configured to determine a camera-characteristic 60 (e.g. the hue 84, the brightness 88, the saturation 78, and/or the temperature 96) of the pixels 70 in the image 32 that are located within the cell 52. It was recognized that the intensity 28 alone was insufficient to distinguish the classification 36 of certain instances of the ground-cover 12, and the camera 30 alone was also insufficient. However, it was discovered that the combination of the lidar-characteristic 42 and the camera-characteristic 60 was effective to distinguish the classification 36 of many instances of the ground-cover 12. Accordingly, the controller 34 is further configured to determine the classification 36 of the patch 50 when the patch is determined to be ground 56, where the classification 36 of the patch 50 is determined based on the lidar-characteristic 42 and the camera-characteristic 60.

In general, the classification 36 is done by comparing the values of various characteristics (e.g. lidar-characteristic 42, camera-characteristic 60) indicated by the lidar 16 and the camera 30 to various characteristic threshold/range values 72 to determine the classification 36 of the ground-cover 12 in question. It is contemplated that empirical testing, possibly in combination with supervised machine learning, will be used to 'train' the controller 34 to determine the classification 36. Machine learning algorithms build a model from an examples training set and use the model to make predications on new data set. An advantage of machine learning is that it can incorporate human knowledge from the training data, and can be cheap and flexible.

More recently, Deep Neural Networks (DNN) have gained popularity as they have outperformed traditional machine learning approaches in challenging applications. Neural networks are computational graphs with input nodes, hidden layers and output nodes. Much of the work using deep learning has been focused on classification, and there is interest in extending the capability of DNN to localizing objects in a field-of-view. It is also contemplated that the results of this training or calibration process will be different for different manufacturers, models, laser wavelength, and the like of the lidar 16.

Below are several non-limiting examples of how the system 10 makes use of the lidar-characteristic 42 and the camera-characteristic 60 to determine the classification of the ground-cover 12, or more specifically the ground-cover 12 in the area defined by the patch 50. In one example embodiment of the system 10, the classification 36 of the patch 50 is determined to be asphalt 74 when the intensity 28 of the patch 50 indicated by the lidar 16 is less than an intensity-threshold 76, and a saturation 78 of the cell 52 indicated by the camera 30 is less than a saturation-threshold 80. That is, because typical examples of asphalt 74 are generally non-reflective and have low color saturation, the intensity 28 (i.e. the reflectivity-value) and the saturation 78 are both relatively low.

In another example embodiment of the system 10, the classification 36 of the patch 50 is determined to be grass 82 when the intensity 28 of the patch 50 indicated by the lidar 16 is greater than the intensity-threshold 76, and a hue 84 of the cell 52 indicated by the camera 30 is within a hue-range 94. That is, grass has a relatively high reflective-factor, so the intensity 28 is greater than the intensity-threshold, and the hue 84 is in a range of green to brown or tan.

In another example embodiment of the system 10, the classification 36 of the patch 50 is determined to be lane-marking 86 when the intensity 28 of the patch 50 indicated by the lidar 16 is greater than the intensity-threshold 76, and a brightness 88 of the cell 52 indicated by the camera 30 is greater than a brightness-threshold 90. That is, a typical example of lane-marking 86 has a relatively high reflective-factor, so the intensity 28 is greater than the intensity-threshold, and the brightness 88 (sometimes referred to as intensity, but brightness is used here to avoid confusion with the intensity 28 provided by the lidar 16) is relatively high, i.e. greater than the brightness-threshold 90.

In another example embodiment of the system 10, the classification 36 of the patch 50 is determined to be snow 92 when the intensity of the patch 50 indicated by the lidar 16 is greater than the intensity-threshold 76, and the saturation 78 of the cell 52 indicated by the camera 30 is less than a saturation-threshold 80.

Another example of the camera-characteristic 60 is a temperature 96 if the camera 30 is so equipped. It is contemplated that a relative comparison of temperature indicated for different regions of the ground-cover could be used to further determine the classification 36 of the ground-cover 12. For example, the temperature 96 of asphalt 74 is expected to be greater than the temperature 96 of grass 82 on a sunny day.

It is further contemplated that the patch 50 may be associated with an adjacent-patch 98 to form a cluster 100 when the classification 36 of the patch 50 and an adjacent-classification the adjacent-patch 98 are equivalent, e.g. both are asphalt, or both are gravel.

Accordingly, a ground-classifier system (the system 10), a controller 34 for the system 10, and a method of operating the system 10 is provided. The system 10 combines characteristic information about the ground-cover 12 from the lidar 16 and the camera 30 to determine the classification 36 of a portion (i.e. the patch 50) of the ground-cover 12.

While this invention has been described in terms of the preferred embodiments thereof, it is not intended to be so limited, but rather only to the extent set forth in the claims that follow.

We claim:

1. A ground-classifier system that classifies a ground-cover proximate to an automated vehicle, said system comprising:
   a lidar that detects a point-cloud of a field-of-view about the automated vehicle;
   a camera that renders an image of the field-of-view; and
   a controller in communication with the camera and the lidar, said controller configured to:
   define a lidar-grid that segregates the point-cloud into an array of patches;
   define a camera-grid that segregates the image into an array of cells, wherein the point-cloud and the image are aligned such that a patch in the array of patches is aligned with a cell in the array of cells;
   determine height values for cloud-points within the patch, wherein the patch is determined to be ground-cover when the height values are less than a height-threshold;
   determine intensity values for the cloud-points within the patch;
   determine temperature values for pixels within the cell; and
   determine, when the patch is determined to be ground-cover, a ground-cover classification of the patch based on the intensity values of the cloud points within the patch and the temperature values of the pixels within the cell.

2. The system in accordance with claim 1, wherein the classification of the patch is determined to be asphalt when:
   the intensity values of the cloud points within the patch are less than an intensity-threshold; and
   saturation values of the pixels within the cell indicated by the camera are less than a saturation-threshold.

3. The system in accordance with claim 1, wherein the classification of the patch is determined to be grass when:
   the intensity values of the cloud points within the patch are greater than an intensity-threshold; and
   hue values of the pixel within the cell indicated by the camera are within a hue-range.

4. The system in accordance with claim 1, wherein the classification of the patch is determined to be lane-marking when:
   the intensity values of the cloud points within the patch are greater than an intensity-threshold; and
   brightness values of the pixels within the cell indicated by the camera are greater than a brightness-threshold.

5. The system in accordance with claim 1, wherein the classification of the patch is determined to be snow when:

the intensity values of the cloud points within the patch are greater than an intensity-threshold; and saturation values of the pixels within the cell indicated by the camera are less than a saturation-threshold.

6. The system in accordance with claim 1, wherein:

the controller is further configured to determine intensity values and temperature values for cloud-points of an adjacent patch and pixels of an adjacent cell, respectively; and the classification of the patch is further based on the intensity values and the temperature values of the adjacent patch and the adjacent cell, respectively.

7. The system in accordance with claim 6, wherein the controller is further configured to determine a classification of the adjacent patch.

8. The system in accordance with claim 7, wherein the controller is further configured to form a cluster when the classification of the patch and the classification of the adjacent patch are equivalent.

9. The system in accordance with claim 6, wherein the classification of the patch is determined to be asphalt when the temperature values for the cell are generally more than a threshold amount greater than the temperature values for the adjacent cell.

10. The system in accordance with claim 6, wherein the classification of the patch is determined to be grass when the temperature values for the cell are generally more than a threshold amount less than the temperature values for the adjacent cell.

11. A method of patch classification performed by a vehicle, the method comprising:

defining a lidar grid that segregates point cloud data from a lidar system of the vehicle into an array of patches;

defining a camera grid that segregates image data from a camera system of the vehicle into an array of cells, the camera grid aligned with the lidar grid such that the cells align with the patches;

determining azimuth angles and elevation angles for cloud-points within a patch of the patches based on the point cloud data corresponding to the patch;

determining height values for the cloud-points within the patch based on the azimuth angles and the elevation angles; and responsive to the height values for the cloud-points within the patch being less than a height threshold:

classifying the patch as ground cover;

determining intensity values for the cloud-points within the patch;

determining temperature values for pixels within a cell of the array of cells that corresponds to the patch based on the image data corresponding to the cell; and determining a ground cover classification of the patch based on the intensity values of the cloud points within the patch and the temperature values of the pixels within the cell.

12. The method of claim 11, wherein the ground cover classification of the patch is determined to be asphalt when:

the intensity values for the cloud points within the patch are generally less than an intensity threshold; and saturation values for the pixels within the cell indicated by the image data are generally less than a saturation threshold.

13. The method of claim 11, wherein the ground cover classification of the patch is determined to be grass when:

the intensity values for the cloud points within the patch are generally greater than an intensity threshold; and hue values for the pixels within the cell indicated by the image data are generally within a hue-range.

14. The method of claim 11, wherein the ground cover classification of the patch is determined to be lane marking when:

the intensity values for the cloud points within the patch are generally greater than an intensity threshold; and brightness values for the pixels within the cell indicated by the image data are generally greater than a brightness-threshold.

15. The method of claim 11, wherein the ground cover classification of the patch is determined to be snow when:

the intensity values for the cloud points within the patch are generally greater than an intensity threshold; and saturation values for the pixels within the cell indicated by the image data are generally less than a saturation threshold.

16. The method of claim 11:

further comprising:

determining adjacent intensity values for cloud points of an adjacent patch; and determining adjacent temperature values for pixels of an adjacent cell that corresponds to the patch; and wherein the ground-cover classification of the patch is further based on the adjacent intensity values and adjacent temperature values.

17. The method of claim 16, further comprising determining an adjacent classification for the adjacent patch.

18. The method of claim 17, further comprising forming a cluster when the classification of the patch and the adjacent classification of the adjacent-patch are equivalent.

19. The method of claim 16, wherein the classification of the patch is determined to be asphalt when the temperature values for the pixels of the cell are generally more than a threshold amount greater than the adjacent temperature values for the pixels of the adjacent cell.

20. The method of claim 16, wherein the classification of the patch is determined to be grass when the temperature values for the pixels of the cell are generally more than a threshold amount less than the adjacent temperature values for the pixels of the adjacent cell.

* * * * *